United States Patent [19]
Römer

[11] 4,299,444
[45] Nov. 10, 1981

[54] DIMMABLE REAR VIEW MIRROR, PARTICULARLY FOR AUTOMOTIVE VEHICLES

[75] Inventor: Horst Römer, Eppstein, Fed. Rep. of Germany

[73] Assignee: VDO Adolf Schindling AG, Frankfurt am Main, Fed. Rep. of Germany

[21] Appl. No.: 175,971

[22] Filed: Aug. 7, 1980

[30] Foreign Application Priority Data

Aug. 25, 1979 [DE] Fed. Rep. of Germany ....... 2934451

[51] Int. Cl.³ .................. G02B 17/00; B60R 1/04
[52] U.S. Cl. .................................. 350/278; 350/337
[58] Field of Search ................. 350/278, 331–335, 350/344, 348, 202, 269, 290, 312, 150–156, 337

[56] References Cited

U.S. PATENT DOCUMENTS

| | | | |
|---|---|---|---|
| 1,908,767 | 5/1933 | Hodny | 350/278 |
| 2,466,625 | 4/1949 | Ulmer | 350/278 X |
| 3,544,195 | 12/1970 | Cameron | 350/278 X |
| 3,862,798 | 1/1975 | Hopkins | 350/278 |
| 3,924,932 | 12/1975 | Yamamoto | 350/337 |
| 4,200,361 | 4/1980 | Malvano et al. | 350/278 X |

*Primary Examiner*—John K. Corbin
*Assistant Examiner*—B. W. de los Reyes
*Attorney, Agent, or Firm*—Martin A. Farber

[57] ABSTRACT

A dimmable rearview mirror, particularly for motor vehicles comprising a reflective surface, two polarization filters spaced apart from each other and arranged in front of the reflective surface as seen in the direction of observation. A liquid crystal cell is disposed between the two polarization filters and includes cell glasses enclosing a liquid crystal substance. The cell glasses are provided with electrodes, the electrodes surfacewise covering essentially the entire surface of the reflective surface. A switchable and/or variable source of voltage is connected to the electrodes for adjusting the degree of reflection of the rearview mirror.

10 Claims, 4 Drawing Figures

DIMMABLE REAR VIEW MIRROR, PARTICULARLY FOR AUTOMOTIVE VEHICLES

The present invention relates to a dimmable rear view mirror, in particular for automotive vehicles.

Such dimmable rear view mirrors have heretofore been constructed in the manner that an optically active pane is arranged tiltably within the mirror and can be tilted by a tilting mechanism into one of two predetermined positions. In the one position of the pane the entire light falling on the mirror is reflected so as to give a brightly reflected image. In the second position of the mirror, on the other hand, only a weakened reflected image arrives at the eye of the viewer so that the danger of dazzling is reduced. The mechanical construction of this mirror is relatively difficult so that it has gained acceptance only slowly, and initially in high-priced cars. The operating of the known dimmable rear view mirror furthermore requires that the driver must with one hand—generally in the dark—reach the point, far distant from the steering wheel, where the mirror is arranged in the vehicle in order to effect dimming. In this connection it must be borne in mind that a rear view mirror as a rule is provided in the vehicle less from the standpoint of being easily reached by the driver than of offering a good view of the road in back and, in case of an accident, causing the slightest possible danger of injury. The actuating of known dimmable rear view mirrors at the mirror itself therefore offers comparatively few advantages as compared with a simple rear view mirror without dimming mechanism which can also be displaced manually but in which, in contradistinction to the dimmable rear view mirror, after displacement, no reflected image at all is visible to the driver and the desired adjustment of the mirror can be reestablished only with difficulty after such displacement.

The object of the present invention is to create a dimmable rear view mirror in which the dimming is not effected mechanically, so that the actuating of the dimming can be separated from the mirror itself. The dimmable rear view mirror should furthermore be characterized by the possibility of streamlined, inexpensive manufacture.

This object is achieved in accordance with the invention in the manner that, in front of a reflective surface (reflector 1) as seen in the direction of view, there is arranged a liquid-crystal cell (2) which, between two polarization filters (3, 4), has cell glasses (5, 6) provided with electrodes (8, 9) and enclosing a liquid-crystal substance (7), that the electrodes cover the surface essentially of the entire mirror surface (1), and that the electrodes are connected with a switchable and/or variable source of voltage (11) for adjusting the degree of reflection of the rear view mirror.

In accordance with the invention there is therefore used for the darkening or dimming of the rear view mirror a liquid-crystal cell, the electrodes of which cover the entire reflective surface. Since liquid-crystal cells are the object of continuous further development and electronic components are generally produced at constantly lower price, in any event as compared with mechanical devices, the invention provides promise of an economic solution for the production of dimmable rear view mirrors. Since the optical properties of the liquid-crystal cell are controlled electrically, the electrical adjustment element provided for this in order to switch or vary a source of voltage can be readily so arranged in the vehicle that it lies favorably within reach of the driver. Little attention on the part of the driver is therefore required in order to dim the mirror, and driving safety is correspondingly increased.

In a variant of the dimmable rear view mirror, the liquid-crystal cell (2) is arranged in front of a separate reflector (1) as the reflective surface. The reflective surface may in this connection therefore be developed in the same way as in the case of an ordinary rear view mirror such as heretofore customary, in front of which then the liquid-crystal cell is to be arranged between the two polarization filters.

In another variant of the dimmable rear view mirror, the rear of the polarization filter (4) is provided with a mirror surface as a reflective surface, the filter (4) being arranged behind the liquid-crystal cell (2) as seen in the direction of observation. In this case therefore the polarization filter is used at the same time as a support for the reflective surface. The polarization surface must for this purpose be subjected to a separate manufacturing process, but on the other hand a separate mirror and the mounting work for applying the mirror in association with the liquid-crystal cell are thereby dispensed with.

In one particularly advantageous embodiment of the dimmable rear view mirror, a display surface (13) is provided, by subdivision of the liquid-crystal cell, alongside of the mirror surface (12), the front-side electrode is structured in the display surface in electrode elements in accordance with the characters and symbols to be indicated (7-segment displays 14), and the electrode elements are connected with a control electronics (15a) for the display of the characters and symbols.

By this important further development of the dimmable rear view mirror, the latter therefore does not serve in the customary fashion merely to provide the driver with a mirror image of what is present behind the vehicle, but also indicates to the driver data which is specific to the vehicle as well as other data. This display is particularly desirable since with the more complete monitoring of the vehicle taking place in the course of modern development, the customary display area in the combined instrument of the instrument panel is not always sufficient. By the further development in accordance with the invention, displays can therefore be shifted to the rear view mirror. This solution is also economic since the liquid-crystal cell of the rear view mirror can be used for it, it merely having to have a certain part of the indicating surface provided with structured electrodes. The structuring can be effected in this connection for instance in the form of an ordinary 7-segment display. These display segments are controlled, also in customary manner, by control electronics depending on the values to be indicated.

In another embodiment of the dimmable rear view mirror which has been further developed in accordance with the invention it is provided that the electrode (8) which is on the front side is structured for simultaneous use of the entire surface of the liquid-crystal cell as an absorption element of the dimmable rear view mirror and as a display in the manner that electrode surfaces (16–19) are joined closely alongside electrode elements (7-segments [15]) formed in accordance with the characters and symbols to be displayed and connected with a control electronics, which electrode surfaces are connected with the switchable and/or variable voltage source in order to adjust the degree of reflection of the rear view mirror (FIG. 3).

In this case therefore it is not merely a part of the surface which is used for the display, but rather the entire area of the rear view mirror which is visible to the driver can display alphanumerical characters or symbols in which the driver is interested. The surface surrounding these characters and symbols serves, however, in customary fashion as the rear view mirror so that for all practical purposes the alphanumerical characters displayed appear mirrored into the reflective image of the surroundings of the car.

In connection with the above-indicated embodiment in which the characters and symbols are displayed over the entire surface of the rear view mirror, it is particularly advantageous for the switchable and/or variable voltage source for the adjustment of the dimming to be coupled with an oppositely switchable and/or variable source of voltage which is connected with the electrode elements which are shaped in accordance with the characters and symbols to be displayed. The two sources of voltage are in this connection advantageously coupled with each other in such a manner that either the characters and symbols are visible dark on a light background when the mirror is not dimmed or, conversely, when it is dimmed are visible light against the dark reflected image of the surroundings.

The invention will be explained below with reference to the four figures of the drawing, in which FIG. 1 shows the dimmable rear view mirror in a cross section, not drawn to scale;

Figure 1:
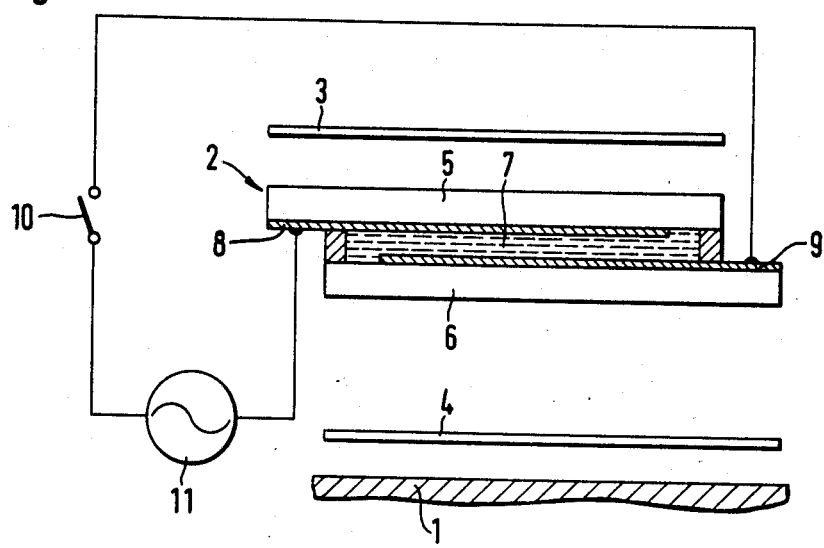

In FIG. 1, a reflector 1 is formed in the same manner as an ordinary rear view mirror. At a distance (not shown to scale) in front of the reflector there is a liquid-crystal cell 2 between a front first polarizer 3 facing the viewer and a rear second polarizer 4, also referred to as an analyzer. The two polarizers and the liquid-crystal cell have an area which is so large that they cover the part of the reflector 1 visible by the driver.

The liquid-crystal cell 2 comprises in particular two cell glasses 5 and 6 which form a container to receive a liquid-crystal substance 7. The two cell glasses are coated on the inside with electrodes 8 and 9 respectively. The electrodes are so thin that they do not substantially impair vision through the liquid crystal cell.

Liquid-crystal effects are based on the property of a liquid-crystal substance in a crystalline phase between solid and liquid state of aggregation to vary its light transmittance upon the application of an electrical field. In this way a partial clouding occurs.

In FIG. 1 a source of voltage 11 which can be connected by means of a switch 10 is provided in order to apply an electric field. The switch may in this connection be arranged, for instance, in the instrument panel of the car at a place other than the customary place at which the rear view mirror is arranged.

If the rear view mirror is not to be dimmed, the switch 10 remains open and the driver sees an undimmed mirror image reflected by the reflector 1. However, if the driver feels that he is being dazzled, he closes the switch 10, due to which a partial clouding of the liquid-crystal substance 7 takes place and this, together with the polarizers 3 and 4, results in a darkening of the reflected image.

Figure 2:
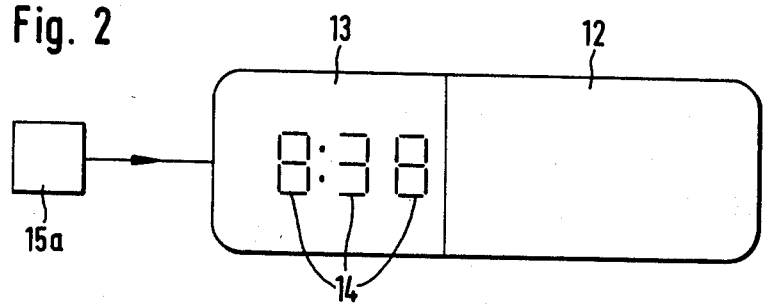
FIG. 2 shows the dimmable rear view mirror in a top view.

From FIG. 2 it can be noted that the rear view mirror has a display area 13 in addition to a mirror area 12. The display area can be developed in particular to indicate the time by means of 7-segment displays 14. The 7-segment displays are controlled by a control electronics 15a in customary fashion. The 7-segment displays can be formed from the same electrode 8 as is used, in accordance with FIG. 1, to dim the rear view mirror in the mirror surface 12.

Figure 3:
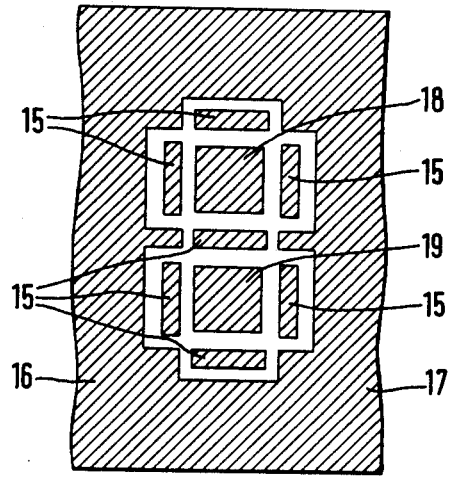
FIG. 3 shows a portion of a front electrode of the liquid-crystal cell which is present in the dimmable rear view mirror.
Figure 4:
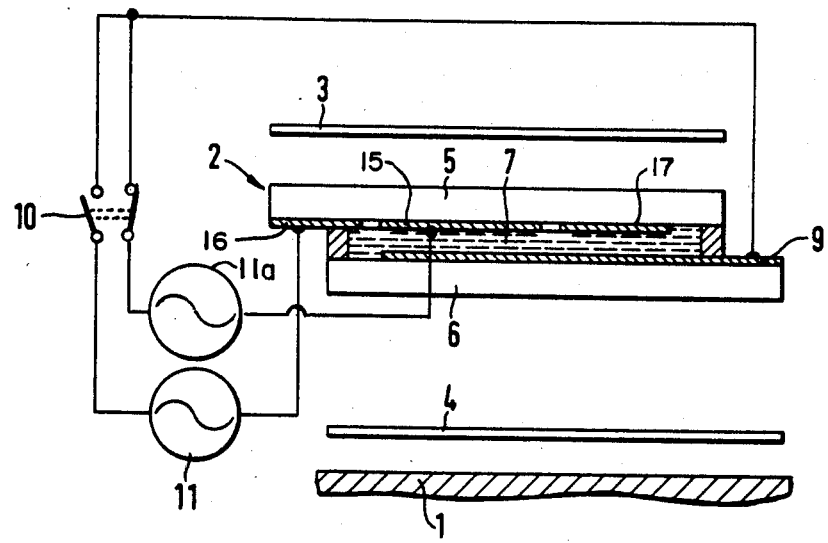
FIG. 4 shows the dimmable rear view mirror of another type in a cross section, not drawn to scale.

In a variant, however, the entire surface of the rear view mirror which is visible to the driver, and therefore the surfaces 12 and 13 in FIG. 2 both together, can be used in order to reflect a dimmable mirror image into which the display is incorporated. For this purpose, the front electrode 8 is shaped in accordance with the cut-out shown in FIG. 3. From FIG. 3 it can be seen that closely adjacent the segments 15 of a 7-segment display there is present the surrounding surface of the mirror with the surface sections 16, 17, 18 and 19. With such a development of the electrode 8 therefore the display appears incorporated in the mirror image. The control of the 7-segment display can be effected in a manner as in accordance with FIG. 4, in which preferably a connection between the source of voltage 11a which is connected with the segments 15 of the 7-segment display and the source of voltage 11 which is connected with the surrounding surface parts 16–19 of the electrode is provided such that the display appears either light on a dark background or vice versa, depending on whether the rear view mirror is dimmed or not. The electrode parts 15–19 are incorporated on the surface of the front cell glass 5 which faces the liquid-crystal substance 7.

I claim:

1. A dimmable rearview mirror, particularly for motor vehicles, comprising a mirror reflective surface constituting a mirror, a liquid crystal cell covered adjacent a rear side thereof by said reflective surface;

two polarization filters spaced apart from each other, said liquid-crystal cell being disposed between said two polarization filters, said liquid-crystal cell includes cell glasses, a liquid-crystal substance enclosed by said cell glasses, and electrodes disposed on said cell glasses, said electrodes cover substantially the entire surface of said liquid crystal cell next to said liquid-crystal substance, means including a source of voltage connected to said electrodes for adjusting the degree of reflection of the rearview mirror in the area of the reflective surface, a display surface at least alongside of said reflective surface formed by one part of the liquid-crystal cell for displaying characters and symbols.

2. The rearview mirror as set forth in claim 1, wherein said reflective surface is provided on a rear side of a rearmost of said polarization filters and constitutes a mirror surface thereon, said rearmost polarization filter is disposed behind said liquid-crystal cell as seen in the direction of observation.

3. The dimmable rearview mirror as set forth in claim 1, wherein a frontmost of said electrodes in said display is structured in electrode elements arranged in accordance with said characters and symbols to be indicated as 7-segment displays, and control electronics means connected to said electrode elements for operatively displaying the characters and symbols respectively, 4. The rearview mirror as set forth in claim 1, further comprising means for actuating said voltage source means spaced from the mirror and disposed closely adjacent the driver.

5. The dimmable rearview mirror as set forth in claim 1, further comprising a frontmost of said electrodes, for simultaneous use of the entire surface of said liquid-crystal cell as an absorption element of the dimmable rearview mirror and as said display, is structured such that electrode surfaces thereof join closely adjacent electrode elements thereof, said display constitutes said electrode elements of said frontmost electrode and said electrode elements and said display extends substantially in front of across the entire visible area of the mirror reflective surface, said electrode elements are formed in accordance with the characters and symbols to be displayed as 7-segment displays, control electronics means connected with said electrode elements for operatively displaying the characters and symbols, respectively, said electrode surfaces are connected with said voltage source means for adjusting the degree of reflection of the rearview mirror.

6. The rearview mirror as set forth in claim 5, further comprising an adjustable second voltage source means including an oppositely source of voltage compared to said first-mentioned voltage source means is connected with said electrode elements and to a rearmost of said electrodes, said first-mentioned and said second voltage source means are coupled with each other.

7. The rearview mirror as set forth in claim 1 or 6, wherein said voltage source means comprise a switchable source of voltage.

8. The rearview mirror as set forth in claim 1 or 6, wherein said voltage source means comprise a changeable source of voltage.

9. The rearview mirror as set forth in claim 1 or 6, wherein said voltage source means comprise a switchable and variable source of voltage.

10. The rearview mirror as set forth in claim 6, further comprising ganged switch means connected to and for the the coupling of said first-mentioned and said second voltage source means for operatively connecting one of said voltage source means, respectively.

* * * * *